(12) United States Patent
Akiba et al.

(10) Patent No.: US 8,711,264 B2
(45) Date of Patent: Apr. 29, 2014

(54) SEGMENTED DISPLAY PANEL AND CAMERA WITH SEGMENTED DISPLAY

(75) Inventors: Yuichi Akiba, Sakado (JP); Kazutoshi Muramatsu, Nishitokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 33 days.

(21) Appl. No.: 12/933,930

(22) PCT Filed: Mar. 24, 2009

(86) PCT No.: PCT/JP2009/056416
§ 371 (c)(1),
(2), (4) Date: Sep. 22, 2010

(87) PCT Pub. No.: WO2009/119865
PCT Pub. Date: Oct. 1, 2009

(65) Prior Publication Data
US 2011/0019061 A1    Jan. 27, 2011

(30) Foreign Application Priority Data
Mar. 25, 2008  (JP) ................................. 2008-078383

(51) Int. Cl.
*H04N 5/225*    (2006.01)

(52) U.S. Cl.
USPC ..................................... 348/333.01; 349/141

(58) Field of Classification Search
USPC .............................. 349/142, 141; 348/333.01
See application file for complete search history.

(56) References Cited

U.S. PATENT DOCUMENTS

| | | | |
|---|---|---|---|
| 4,277,786 A * | 7/1981 | Waldron | 345/53 |
| 6,774,970 B1 * | 8/2004 | Sekiguchi | 349/142 |
| 7,440,060 B2 * | 10/2008 | Lee | 349/141 |
| 7,619,434 B1 * | 11/2009 | Lorenz et al. | 324/763.01 |
| 2001/0026126 A1 * | 10/2001 | Nakaya et al. | 313/506 |
| 2002/0122148 A1 * | 9/2002 | Niiyama et al. | 349/123 |
| 2005/0128401 A1 * | 6/2005 | Lee | 349/139 |
| 2007/0183015 A1 * | 8/2007 | Jacobs et al. | 359/245 |
| 2007/0279569 A1 * | 12/2007 | Koishi | 349/149 |
| 2008/0068544 A1 * | 3/2008 | Tomita | 349/115 |
| 2008/0151168 A1 * | 6/2008 | Sekiguchi | 349/142 |
| 2009/0002267 A1 * | 1/2009 | Nam et al. | 345/6 |
| 2010/0171894 A1 * | 7/2010 | Lee et al. | 349/38 |

FOREIGN PATENT DOCUMENTS

| | | | |
|---|---|---|---|
| JP | 52-089496 A | | 7/1977 |
| JP | S54-025750 A | | 2/1979 |
| JP | 55137510 A | * | 10/1980 |
| JP | 11-337672 A | | 12/1999 |
| JP | 11-337960 A | | 12/1999 |
| JP | 55-137510 A | | 12/1999 |

OTHER PUBLICATIONS

International Search Report of PCT/JP2009/056416, May 12, 2009.
Japanese Patent Office, Japanese Office Action for Application No. 2010-505879, Oct. 2, 2012, p. 1-2.

* cited by examiner

*Primary Examiner* — Nicholas Giles
*Assistant Examiner* — Abdelaaziz Tissire (57) ABSTRACT

The invention is directed to the provision of a display panel in which, while providing a sufficient gap between two electrodes, the gap is made not easily visible. The display panel according to the invention includes: a first substrate having a first electrode and a second electrode formed on one and the same side thereof; a second substrate disposed opposite the first substrate; a gap formed between the first electrode and the second electrode; a backup electrode formed on the first substrate so as to overlap the gap; and a wiring electrode electrically connected to the first or second electrode, wherein the wiring electrode is formed in the same plane as the backup electrode.

4 Claims, 11 Drawing Sheets

SEGMENTED DISPLAY PANEL AND CAMERA WITH SEGMENTED DISPLAY

TECHNICAL FIELD

The present invention relates to a display panel and a camera, and more particularly to a segment display panel and a camera that contains a segment display panel.

BACKGROUND ART

There are two main types of display panels: the matrix type and segment type. The matrix type is in widespread use because it can display any desired image. The segment type, on the other hand, is widely used in applications that display specific patterns, as in digital watches and mobile telephones.

Figure 1:
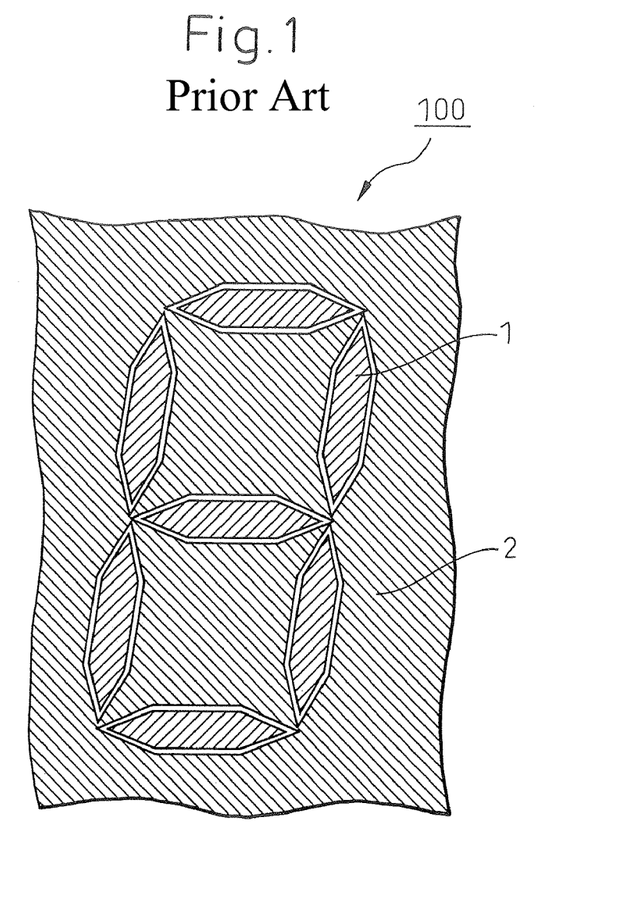
FIG. 1 is a plan view of a prior art segment display panel.

A representative type of segment display panel is the seven-segment type which is used in such applications as pocket calculators. FIG. 1 shows an electrode layout in a seven-segment display panel 100. As shown in FIG. 1, seven segment electrodes 1 are arranged in a figure-eight pattern to display numbers, etc. To enhance the display capability, there is proposed a display panel having a background electrode 2 in an area surrounding the segment electrodes 1 (refer, for example, to patent document 1). By using the background electrode 2 in combination of the segment electrodes 1 for display, it is possible to present a reverse video display, etc., and the display capability can thus be enhanced.

Figure 2A:
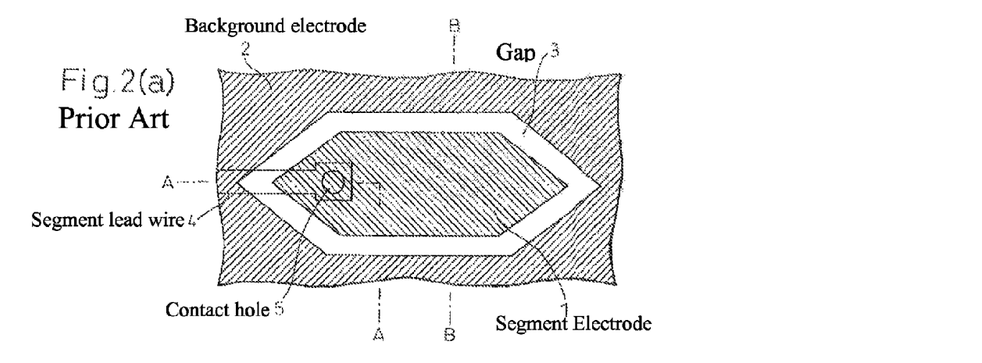
FIG. 2(a) is a plan view of the prior art segment display panel.
Figure 2B:
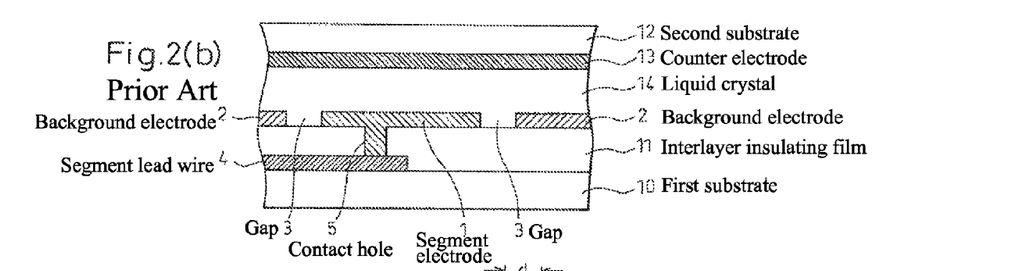
FIG. 2(b) is a cross-sectional view taken along A-A in FIG. 2(a)
Figure 2C:
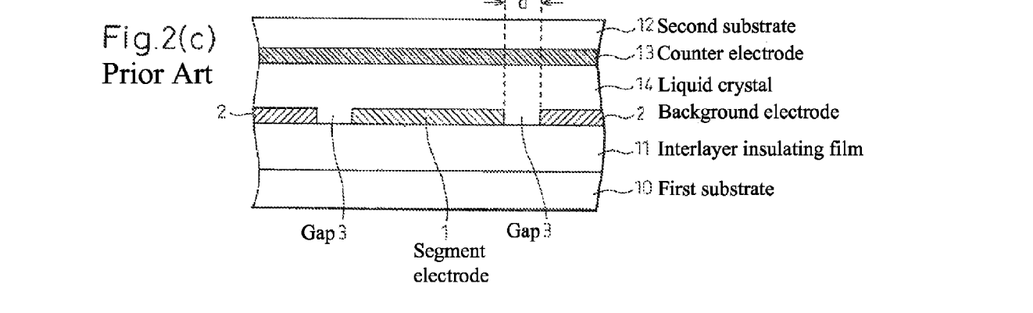
FIG. 2(c) is a cross-sectional view taken along B-B in FIG. 2(a).

The structure of the prior art segment display panel will be described below. FIGS. 2(a) to 2(c) are schematic diagrams showing the structure of one segment in the display panel 100 of FIG. 1. FIG. 2(a) is a plan view showing the segment electrode 1 and the background electrode 2 arranged around the periphery thereof. In the illustrated structure, the background electrode 2 is formed so as to surround the periphery of the segment electrode 1 by interposing a prescribed gap 3 therebetween. A segment lead wire 4 is provided which is electrically connected to the segment electrode 1 via a contact hole 5 to apply a voltage to the segment electrode 1. The gap refers to the spacing separating one electrode from the other in a direction parallel to the substrate.

FIG. 2(b) is a cross-sectional view taken along A-A in FIG. 2(a). The segment lead wire 4 formed from indium tin oxide (ITO) is provided on a first substrate 10 formed from a glass substrate, and an interlayer insulating film 11 is formed on the segment lead wire 4. The segment electrode 1 and the background electrode 2, both formed from ITO and separated from each other by the gap 3, are formed on the interlayer insulating film 11, and the segment electrode 1 and the segment lead wire 4 are electrically connected together through the contact hole 5. A second substrate 12 is disposed a prescribed distance apart from the first substrate 10, and a counter electrode 13 is formed on the second substrate 12. A liquid crystal 14 is sandwiched between the first substrate 10 and the second substrate 12. A desired display is produced by changing the orientation state of the liquid crystal 14 by applying a voltage between the segment electrode 1 and the counter electrode 13 or between the background electrode 2 and the counter electrode 13.

FIG. 2(c) is a cross-sectional view taken along B-B in FIG. 2(a). The cross section is identical in structure to that shown in FIG. 2(b), except that the segment lead wire is not provided on the first substrate 10 shown here. In the figure, the width of the gap 3 is denoted by d. Since the electrodes for driving the liquid crystal are not formed in the area where the gap 3 is formed, this area cannot be used to produce the display and, even if the segment electrode 1 and the background electrode 2 are driven at the same potential, the contour of the segment electrode becomes visible. It is therefore desirable to reduce the width d of the gap 3 to a visually imperceptible level.

Patent document 1: Japanese Unexamined Patent Publication No. H11-337960

DISCLOSURE OF THE INVENTION

However, when using such a display panel in combination with a camera viewfinder or the like, since the panel is magnified for viewing, there has been the problem that the gap tends to be easily visible, even if the gap width d is reduced. There has also been the problem that, as the width d is made smaller, defects or failures are more likely to occur during the patterning process of the segment electrode 1 and the background electrode 2.

Accordingly, it is an object of the present invention to provide a display panel and a camera in which, while providing a sufficient gap between the two electrodes, the gap is not easily visible.

A display panel according to the present invention includes: a first substrate having a first electrode and a second electrode formed on one and the same side thereof; a second substrate disposed opposite the first substrate; a gap formed between the first electrode and the second electrode; a backup electrode formed on the first substrate so as to overlap the gap; and a wiring electrode electrically connected to the first or second electrode, wherein the wiring electrode is formed in the same plane as the backup electrode.

In this case, the wiring electrode and the backup electrode may be formed in an integrated fashion.

Further, it is preferable that a portion of the backup electrode overlaps a portion of at least one of the first and second electrodes.

A camera according to the present invention includes: a picture-taking lens for focusing an image of a subject; a half mirror for reflecting a portion of the image; a viewfinder for viewing the image; and a display panel provided between the half mirror and the viewfinder, the display panel including a first substrate having a first electrode and a second electrode formed on one and the same side thereof, and a second substrate disposed opposite the first substrate, wherein the first electrode and the second electrode are formed with a prescribed gap provided therebetween, the display panel further including a backup electrode formed on the first substrate so as to overlap the gap, and a wiring electrode electrically connected to the first or second electrode, wherein the wiring electrode is formed in the same plane as the backup electrode.

According to the present invention, if a gap is provided between the electrodes, the gap can be made not easily visible by virtue of the backup electrode. Furthermore, since the gap can be made wider compared with the prior art structure, it is possible to reduce the possibility of defects due to shorts in the electrode patterning process.

BRIEF DESCRIPTION OF THE DRAWINGS

FIG. 4(*a*) is a plan view of a segment display panel according to a second embodiment of the present invention, FIG. 4(*b*) is a cross-sectional view taken along A-A in FIG. 4(*a*), and FIG. 4(*c*) is a cross-sectional view taken along B-B in FIG. 4(*a*).

FIG. 5(*a*) is a plan view of a segment display panel according to a third embodiment of the present invention, FIG. 5(*b*) is a cross-sectional view taken along A-A in FIG. 5(*a*), and FIG. 5(*c*) is a cross-sectional view taken along C-C in FIG. 5(*a*).

FIG. 9(*a*) is a plan view showing the display of segments when the character "A" is displayed on the one particular key on the prior art programmable keyboard, and FIG. 9(*b*) is a plan view showing the display of segments when the character "1" is displayed on the one particular key on the prior art programmable keyboard.

FIG. 11(*a*) is a plan view showing the display of segments when the character "A" is displayed on the one particular key on the programmable keyboard of the present invention, and FIG. 11(*b*) is a plan view showing the display of segments when the character "1" is displayed on the one particular key on the programmable keyboard of the present invention.

BEST MODE FOR CARRYING OUT THE INVENTION

A display panel and a camera according to the present invention will be described below with reference to the drawings. It should, however, be noted that the technical scope of the present invention is not limited to the specific embodiments described herein, but extends to the inventions described in the appended claims and their equivalents.

Figure 3A:
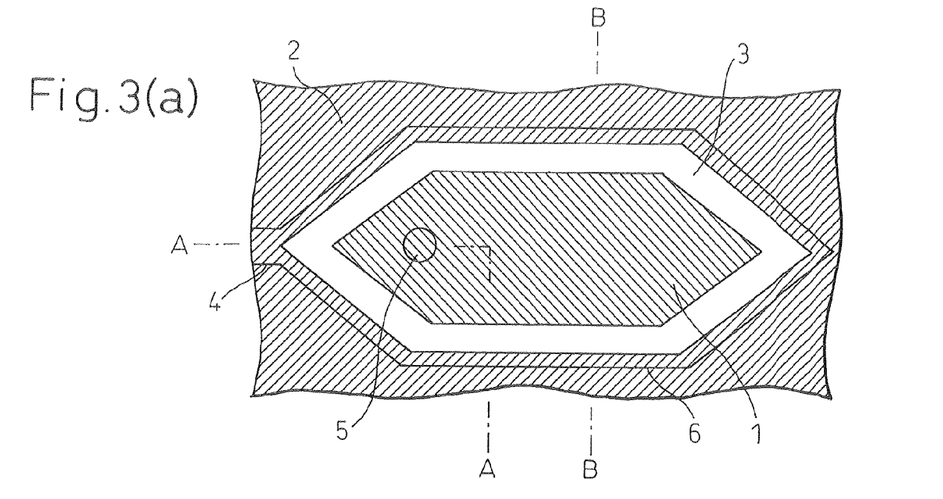
FIG. 3(a) is a plan view of a segment display panel according to a first embodiment of the present invention.

First, a first embodiment of the present invention will be described with reference to FIG. 3. FIG. 3(*a*) is a plan view of a unit segment in the segment display panel according to the first embodiment of the present invention. A background electrode 2 is formed around the periphery of a segment electrode 1 by interposing a gap 3 therebetween. A segment lead wire 4 and a backup electrode 6 are together formed in a layer below the segment electrode 1 by interposing an interlayer insulating film therebetween, and are electrically connected to the segment electrode 1 through a contact hole 5. This allows a voltage to be applied to the segment electrode 1 separately from the background electrode 2.

Further, the display panel of the first embodiment is characterized in that the backup electrode 6 is arranged so as to overlap the gap 3. Since the liquid crystal 14 in the area where the gap 3 is formed can be driven with this backup electrode 6, if a relatively large gap 3 is provided between the segment electrode 1 and the background electrode 2, the gap 3 can be made not easily visible. In the display panel of the first embodiment, the backup electrode 6 is formed not only below the gap 3 but also below the segment electrode 1.

Figure 3B:
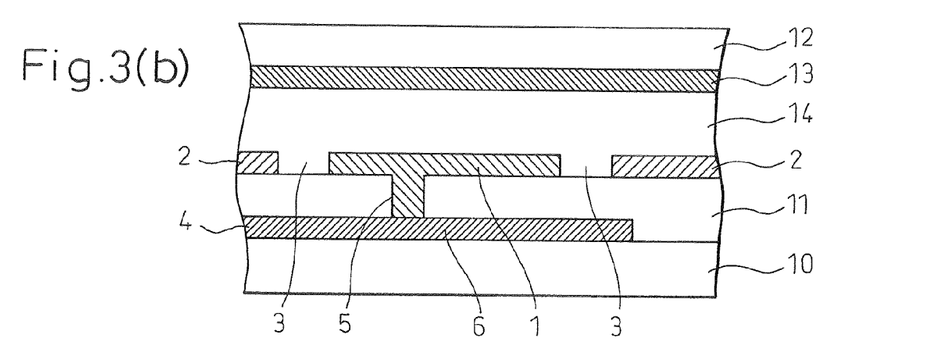
FIG. 3(b) is a cross-sectional view taken along A-A in FIG. 3(a)

FIG. 3(*b*) is a cross-sectional view taken along A-A in FIG. 3(*a*). As shown in FIG. 3(*b*), the display panel of the first embodiment is characterized in that the backup electrode 6 is formed below the gap 3. The structure of the display panel of the first embodiment will be described. The segment lead wire 4 and the backup electrode 6 are formed in an integrated fashion by depositing ITO to a thickness of about 30 nm on a first substrate 10 formed from a glass substrate with a thickness of about 0.5 mm. Further, the interlayer insulating film 11 with a thickness of about 1 µm is formed over the segment lead wire 4 and the backup electrode 6. The segment electrode 1 and the background electrode 2, separated from each other by the gap 3, are formed by depositing ITO to a thickness of about 30 nm on the interlayer insulating film 11, and the segment electrode 1 and the segment lead wire 4 are electrically connected together through the contact hole 5. A second substrate 12 formed from a glass substrate with a thickness of about 0.5 mm is disposed a prescribed distance apart from the first substrate 10, and a counter electrode 13 is formed by depositing ITO to a thickness of about 30 nm on the second substrate 12. The liquid crystal 14, formed from a polymer-dispersed liquid crystal material (for example, a polymer network liquid crystal (PNLC) manufactured by Dainippon Ink and Chemicals, Inc.), is sandwiched in the gap of about 8 µm formed between the first substrate 10 and the second substrate 12. A desired display is produced by changing the orientation state of the liquid crystal 14 by applying a voltage between the segment electrode 1 and the counter electrode 13 or between the background electrode 2 and the counter electrode 13.

Figure 3C:
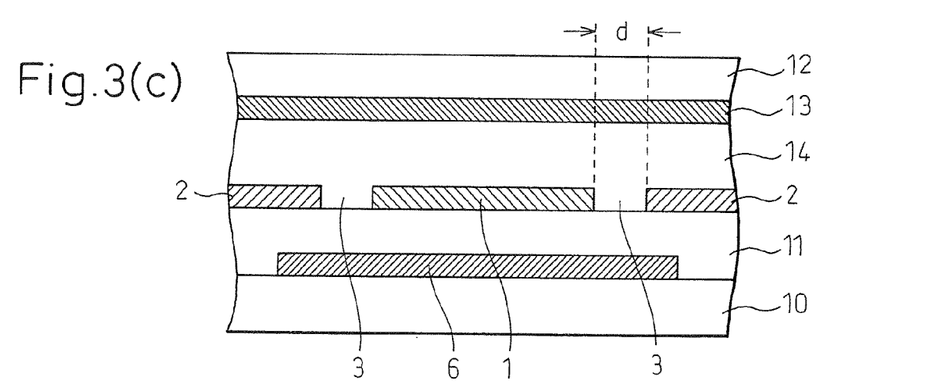
FIG. 3(c) is a cross-sectional view taken along B-B in FIG. 3(a).

FIG. 3(*c*) is a cross-sectional view taken along B-B in FIG. 3(*a*). The layer structure is essentially the same as that shown in FIG. 3(*b*). As shown in FIG. 3(*c*), the display panel of the first embodiment is characterized in that the backup electrode 6 is arranged not only below the gap 3 and but also below the segment electrode 1. It is preferable to form the backup electrode 6 in such a manner as to partly overlap the background electrode 2 so that light does not enter directly through the gap 3 even when seen in an oblique direction. The liquid crystal layer in the area where the gap separating between the segment electrode 1 and the background electrode 2 is formed can be driven by applying a voltage between the backup electrode 6 and the counter electrode 13. In the structure of the first embodiment, the backup electrode 6 and the segment electrode 1 are at the same potential, since the segment lead wire 4 and the backup electrode 6 are formed in an integrated fashion. Accordingly, by applying a voltage to the segment electrode 1, the liquid crystal in the area of the gap 3 can be driven in the same way as the liquid crystal in the area of the segment electrode 1.

Since the segment electrode 1 and the backup electrode 6 are at the same potential, and since the voltage applied to the liquid crystal in the area of the gap 3 is determined by the layer member, other than the liquid crystal, located between the electrodes, the difference between it and the voltage applied to the segment area can be controlled by adjusting the thickness of the interlayer insulating film 11. More specifically, if the thickness of the interlayer insulating film 11 is reduced, the voltage applied to the liquid crystal in the area of the gap 3 becomes substantially equal to the voltage applied to the segment area, and the liquid crystal in the area of the gap 3 and the liquid crystal in the area of the segment electrode 1 can be driven in substantially the same way. Conversely, if the thickness of the interlayer insulating film 11 is increased, the voltage applied to the liquid crystal in the area of the gap 3 becomes smaller than the voltage applied to the liquid crystal in the area of the segment electrode 1, and thus the transmittance of light in the area where the gap 3 is formed can be made different from that in the area where the segment electrode 1 is formed. For example, a gradation of tone can be produced by making the tone of the area of the gap 3 thinner than the tone of the area of the segment electrode 1.

Furthermore, in the display panel of the first embodiment, since the liquid crystal in the area of the gap 3 can be driven with the backup electrode 6 arranged below the gap 3, the gap 3 is not easily visible to the naked eye even if its width d, measured along a direction parallel to the substrate, is increased. For example, even when a display panel having a gap width of about 10 µm is used with a viewfinder and magnified through a lens or the like for viewing, the gap can be made not easily visible.

Figure 4A:
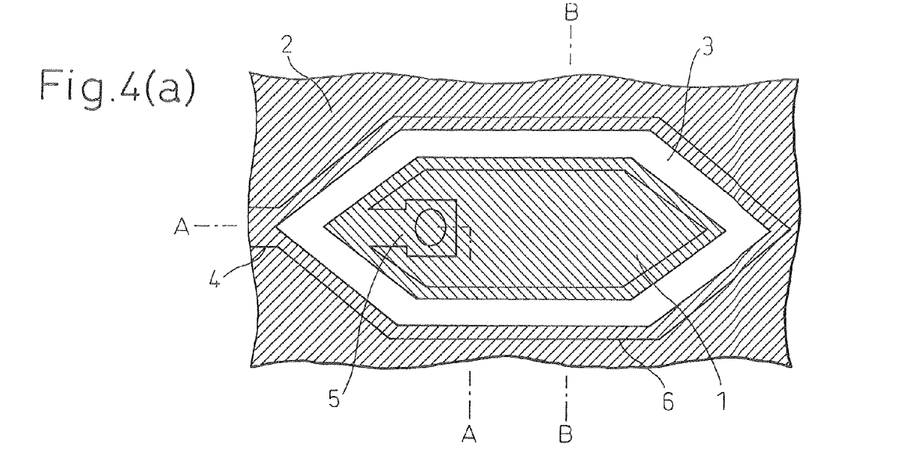

Next, a second embodiment of the present invention will be described with reference to FIG. 4. FIG. 4(a) is a plan view of a unit segment in the segment display panel according to the second embodiment of the present invention. In the display panel according to the second embodiment, as in the first embodiment, the segment lead wire 4 is formed in a layer below the segment electrode 1 by interposing an interlayer insulating film therebetween, and is electrically connected to the segment electrode 1 through a contact hole 5. This allows a voltage to be applied to the segment electrode 1 separately from the background electrode 2.

Further, in the display panel of the second embodiment, as in the first embodiment, the backup electrode 6 is arranged so as to overlap the gap 3. Since the liquid crystal in the area where the gap 3 is formed can be driven with this backup electrode 6, if a relatively large gap 3 is provided between the segment electrode 1 and the background electrode 2, the gap 3 can be made not easily visible. In the display panel of the second embodiment, unlike the first embodiment, the backup electrode 6 is formed only below the gap 3 and in the vicinity thereof, but not formed below the segment electrode 1. With this configuration, the transmittance of light through ITO in the area where the segment electrode 1 is formed becomes substantially equal to that in the area where the background electrode 2 is formed, and the segment electrode 1 can thus be made not easily visible even when no voltage is applied.

Figure 4B:
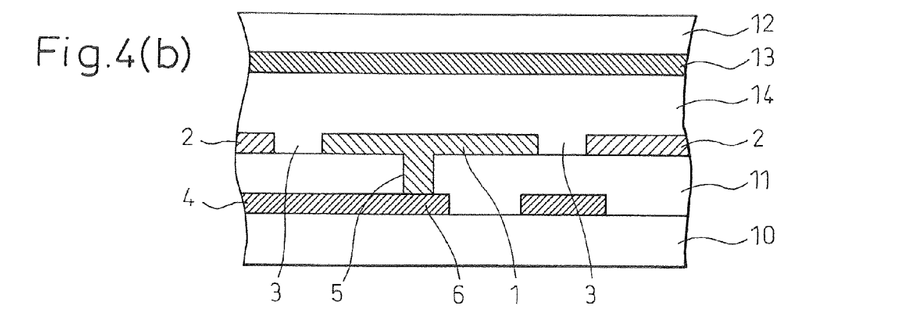

FIG. 4(b) is a cross-sectional view taken along A-A in FIG. 4(a). The structure of the display panel of the second embodiment will be described. The segment lead wire 4 and the backup electrode 6 are formed in an integrated fashion by depositing ITO to a thickness of about 30 nm on a first substrate 10 formed from a glass substrate with a thickness of about 0.5 mm. Further, the interlayer insulating film 11 with a thickness of about 1 µm is formed over the segment lead wire 4 and the backup electrode 6. The segment electrode 1 and the background electrode 2, separated from each other by the gap 3, are formed by depositing ITO to a thickness of about 30 nm on the interlayer insulating film 11, and the segment electrode 1 and the segment lead wire 4 are electrically connected together through the contact hole 5. A second substrate 12 formed from a glass substrate with a thickness of about 0.5 mm is disposed a prescribed distance apart from the first substrate 10, and a counter electrode 13 is formed by depositing ITO to a thickness of about 30 nm on the second substrate 12. The liquid crystal 14, formed from a polymer-dispersed liquid crystal material (for example, a polymer network liquid crystal (PNLC) manufactured by Dainippon Ink and Chemicals, Inc.), is sandwiched in the gap of about 8 µm formed between the first substrate 10 and the second substrate 12. A desired display is produced by changing the orientation state (the degree of scattering) of the liquid crystal 14 by applying a voltage between the segment electrode 1 and the counter electrode 13 or between the background electrode 2 and the counter electrode 13.

As shown in FIG. 4(b), the display panel of the second embodiment is identical in structure to that of the first embodiment in that the backup electrode 6 is formed below the gap 3. On the other hand, the difference from the first embodiment is that the backup electrode 6 is not formed below the segment electrode 1; only the segment lead wire 4 is arranged below the segment electrode 1.

Figure 4C:
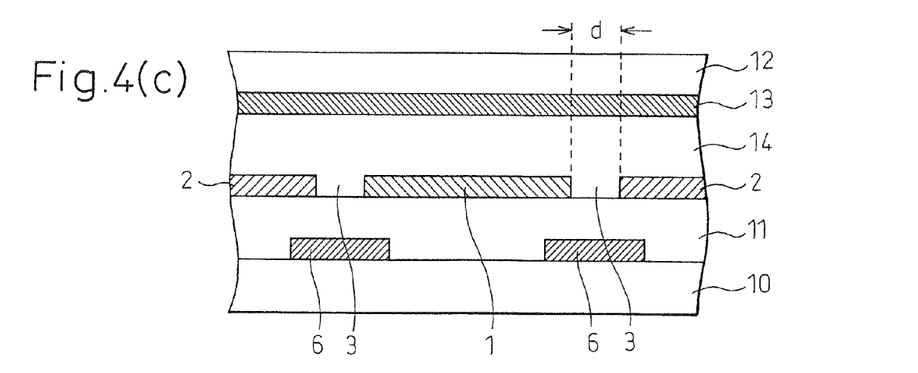

FIG. 4(c) is a cross-sectional view taken along B-B in FIG. 4(a). The layer structure is essentially the same as that shown in FIG. 4(b). As shown in FIG. 4(c), the display panel of the second embodiment is characterized in that the backup electrode 6 is arranged only in the area below the gap 3. However, it is preferable to form the backup electrode 6 in such a manner as to partly overlap the segment electrode 1 and the background electrode 2 so that light does not enter directly through the gap 3 even when seen in an oblique direction. The liquid crystal layer in the area where the gap separating between the segment electrode 1 and the background electrode 2 is formed can be driven by applying a voltage between the backup electrode 6 and the counter electrode 13. In the structure of the second embodiment, since the segment lead wire 4 and the backup electrode 6 are formed in an integrated fashion, as in the first embodiment, the backup electrode 6 and the segment electrode 1 are at the same potential. Accordingly, by applying a voltage to the segment electrode 1, the liquid crystal in the area of the gap 3 can be driven in the same way as the segment.

Here, since the segment electrode 1 and the backup electrode 6 are at the same potential, and since, in the display panel of the second embodiment, the voltage applied to the liquid crystal in the area of the gap 3 is determined by the layer member, other than the liquid crystal, located between the electrodes, as in the first embodiment, the difference between it and the voltage applied to the segment area can be adjusted by controlling the thickness of the interlayer insulating film 11. More specifically, if the thickness of the interlayer insulating film 11 is reduced, the voltage applied to the liquid crystal in the area of the gap 3 becomes substantially equal to the voltage applied to the liquid crystal in the area where the segment area is formed, and the liquid crystal in the area of the gap 3 and the liquid crystal in the area of the segment electrode 1 can be driven in substantially the same way. Conversely, if the thickness of the interlayer insulating film 11 is increased, the voltage applied to the liquid crystal in the area of the gap 3 becomes smaller than the voltage applied to the liquid crystal in the area of the segment electrode 1, and thus the transmittance of light in the area where the gap 3 is formed can be made different from that in the area where the segment electrode 1 is formed. For example, a gradation of tone can be produced by making the tone of the area of the gap 3 thinner than the tone of the area of the segment electrode 1.

Furthermore, in the display panel of the second embodiment, since the liquid crystal in the area of the gap 3 can be driven with the backup electrode 6 arranged below the gap 3, as in the first embodiment, the gap 3 is not easily visible to the naked eye even if its width d, measured along a direction parallel to the substrate, is increased. For example, even when a display panel having a gap width of about 10 µm is used with a viewfinder and magnified through a lens or the like for viewing, the gap can be made not easily visible.

Figure 5A:
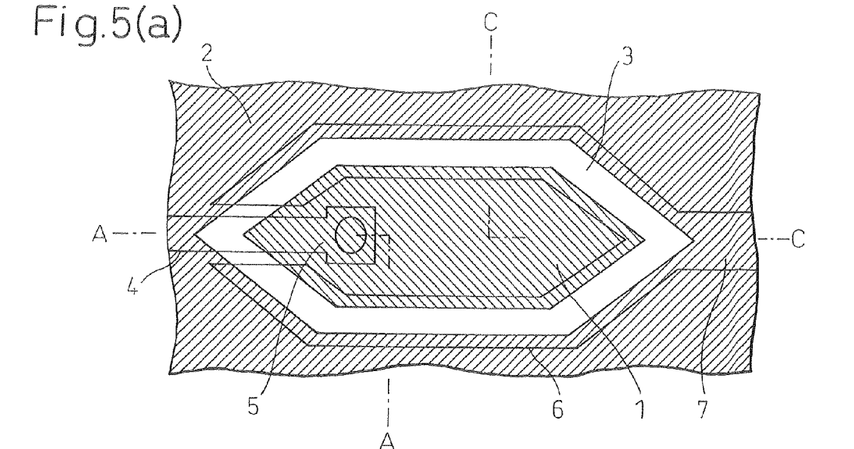

Next, a third embodiment of the present invention will be described with reference to FIG. 5. FIG. 5(a) is a plan view of a unit segment in the segment display panel according to the third embodiment of the present invention. In the display panel according to the third embodiment, as in the first and second embodiments, the segment lead wire 4 is formed in a layer below the segment electrode 1 by interposing an interlayer insulating film therebetween, and is electrically connected to the segment electrode 1 through a contact hole 5.

This allows a voltage to be applied to the segment electrode 1 separately from the background electrode 2.

Further, in the display panel of the third embodiment, as in the first and second embodiments, the backup electrode 6 is arranged so as to overlap the gap 3. Since the liquid crystal in the area where the gap 3 is formed can be driven with this backup electrode 6, if a relatively large gap 3 is provided between the segment electrode 1 and the background electrode 2, the gap 3 can be made not easily visible. In the display panel of the third embodiment, like the second embodiment, the backup electrode 6 is formed only below the gap 3 and in the vicinity thereof, but not formed below the segment electrode 1. With this configuration, the transmittance of light in the area where the segment electrode 1 is formed becomes substantially equal to that in the area where the background electrode 2 is formed, and the segment electrode 1 can thus be made not easily visible even when no voltage is applied.

On the other hand, unlike the second embodiment, the backup electrode 6 in the display panel of the third embodiment is not electrically connected to the segment lead wire 4, but a backup lead wire 7 is provided to apply a voltage to the backup electrode 6. With this configuration, the potential at the backup electrode 6 can be made different from the potential at the segment lead wire 4, allowing the liquid crystal in the area of the gap 3 to be driven separately from the liquid crystal in the area of the segment electrode 1.

Figure 5B:
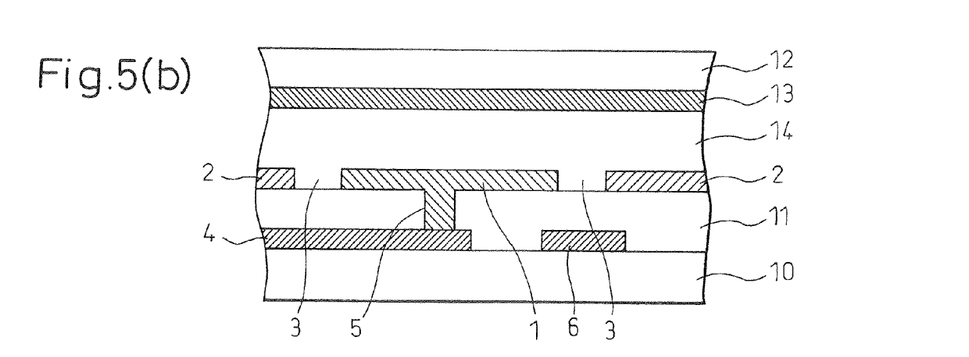

FIG. 5(*b*) is a cross-sectional view taken along A-A in FIG. 5(*a*). The structure of the display panel of the third embodiment will be described. The segment lead wire 4, the backup electrode 6, and the backup lead wire 7 are formed by depositing ITO to a thickness of about 30 nm on a first substrate 10 formed from a glass substrate with a thickness of about 0.5 mm. The backup electrode 6 and the backup lead wire 7 are formed in an integrated fashion. Further, the interlayer insulating film 11 with a thickness of about 1 μm is formed over the segment lead wire 4, the backup electrode 6, and the backup lead wire 7. The segment electrode 1 and the background electrode 2, separated from each other by the gap 3, are formed by depositing ITO to a thickness of about 30 nm on the interlayer insulating film 11, and the segment electrode 1 and the segment lead wire 4 are electrically connected together through the contact hole 5. A second substrate 12 formed from a glass substrate with a thickness of about 0.5 mm is disposed a prescribed distance apart from the first substrate 10, and a counter electrode 13 is formed by depositing ITO to a thickness of about 30 nm on the second substrate 12. The liquid crystal 14, formed from a polymer-dispersed liquid crystal material (for example, a polymer network liquid crystal (PNLC) manufactured by Dainippon Ink and Chemicals, Inc.), is sandwiched in the gap of about 8 μm formed between the first substrate 10 and the second substrate 12. A desired display is produced by changing the orientation state of the liquid crystal 14 by applying a voltage between the segment electrode 1 and the counter electrode 13 or between the background electrode 2 and the counter electrode 13.

As shown in FIG. 5(*b*), the display panel of the third embodiment is identical in structure to the first and second embodiments in that the backup electrode 6 is formed below the gap 3. Further, as in the second embodiment, the backup electrode 6 is not arranged below the segment electrode 1; only the segment lead wire 4 is arranged below the segment electrode 1. On the other hand, the difference from the second embodiment is that the segment lead wire 4 and the backup electrode 6 are electrically isolated from each other.

Figure 5C:
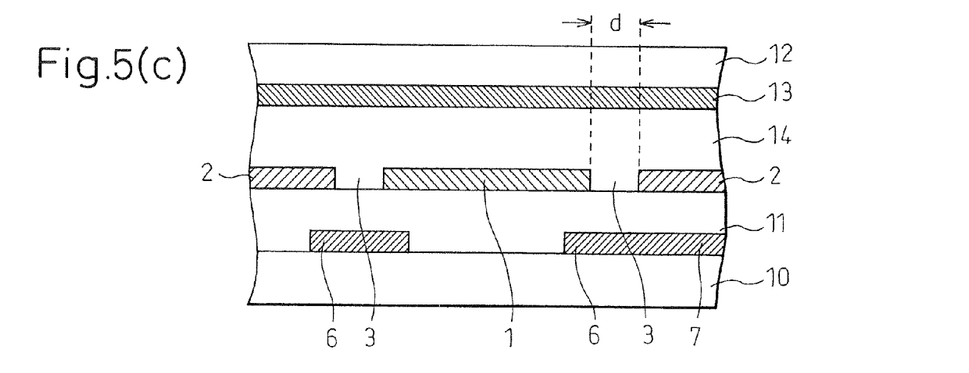

FIG. 5(*c*) is a cross-sectional view taken along C-C in FIG. 5(*a*). The layer structure is essentially the same as that shown in FIG. 5(*b*). As shown in FIG. 5(*c*), the display panel of the third embodiment is characterized in that the backup electrode 6 is arranged only in the layer below the gap 3, as in the second embodiment. Also, it is preferable to form the backup electrode 6 in such a manner as to partly overlap the segment electrode 1 and the background electrode 2 so that light does not enter directly through the gap 3 even when seen in an oblique direction. The liquid crystal layer in the area where the gap separating between the segment electrode 1 and the background electrode 2 is formed can be driven by applying a voltage between the backup electrode 6 and the counter electrode 13. In the structure of the third embodiment, since the segment lead wire 4 and the backup electrode 6 are electrically isolated from each other, the potential at the backup electrode 6 can be made different from the potential at the segment electrode 1. Accordingly, the liquid crystal in the area of the gap 3 can be driven separately from the liquid crystal in the area of the segment electrode 1.

Since the voltage applied to the liquid crystal in the area of the gap 3 is also affected by the layer member, other than the liquid crystal, located between the electrodes, the difference between it and the voltage applied to the segment area can be adjusted by controlling the thickness of the interlayer insulating film 11. More specifically, if it is assumed that the segment electrode 4 and the backup electrode 6 are at the same potential, then if the thickness of the interlayer insulating film 11 is reduced, the voltage applied to the liquid crystal in the area of the gap 3 becomes substantially equal to the voltage applied to the segment area, and the liquid crystal in the area of the gap 3 and the liquid crystal in the area of the segment electrode 1 can be driven in substantially the same way. Conversely, if the thickness of the interlayer insulating film 11 is increased, the voltage applied to the liquid crystal in the area of the gap 3 becomes smaller than the voltage applied to the liquid crystal in the area of the segment electrode 1, and thus the transmittance of light in the area where the gap 3 is formed can be made different from that in the area where the segment electrode 1 is formed. For example, a gradation of tone can be produced by making the tone of the area of the gap 3 thinner than the tone of the area of the segment electrode 1. Further, unlike the case of the first and second embodiments, if the electric field applied to the liquid crystal between the backup electrode 6 and the counter electrode 13 is made the same as the electric field applied to the liquid crystal between the segment electrode 1 and the counter electrode 13 (the same voltage is applied to the liquid crystal in these two areas) by considering the thickness of the interlayer insulating film, the liquid crystal in the area of the segment electrode 1 and the liquid crystal in the area of the gap 3 can be driven with the same electric field, and the transmittance of light can be made equal between the two areas.

Furthermore, in the display panel of the third embodiment, since the liquid crystal in the area of the gap 3 can be driven with the backup electrode 6 arranged below the gap 3, as in the first and second embodiments, the gap 3 is not easily visible to the naked eye even if its width d, measured along a direction parallel to the substrate, is increased. For example, even when a display panel having a gap width of about 10 μm is used with a viewfinder and magnified through a lens or the like for viewing, the gap can be made not easily visible.

The first to third embodiments above have been described by taking an example of the display panel in which PNLC is used as the liquid crystal, but other suitable types of liquid crystal, such as a twisted nematic (TN) liquid crystal, may be used instead. When using a TN liquid crystal, for example, a polarizer and an alignment film should be attached to each of the first and second substrates 10 and 12.

Further, the first to third embodiments have been described by taking a transmissive display panel as an example of the display panel, but it is also possible to use a reflective display panel. In that case, a reflective plate should be attached to one or the other of the first and second substrates 10 and 12.

The first to third embodiments have also been described by taking an example of the display panel that uses unit electrodes of the seven-segment type, but it will be appreciated that the present invention is also equally applicable to cases in which electrodes of other configurations are used. That is, designating the segment electrode as the first electrode and the background electrode as the second electrodes, the present invention can be applied to any other display panel in which a prescribed gap is formed between the first and second electrodes, and the first and second electrodes are not limited to those described in the embodiments given herein.

While the first to third embodiments have been described by taking an example of the display panel in which ITO is deposited on two insulating layers, it will be appreciated that the present invention is also equally applicable to cases in which ITO is deposited on three or more insulating layers. For example, the segment electrode, the segment lead wire, and the backup electrode may be formed on respectively different layers.

Further, the first to third embodiments have been described by taking an example of the display panel in which the segment electrode and the background electrode are formed on the same insulating layer, but the present invention can also be applied to cases in which they are formed on different insulating layers.

Figure 6:
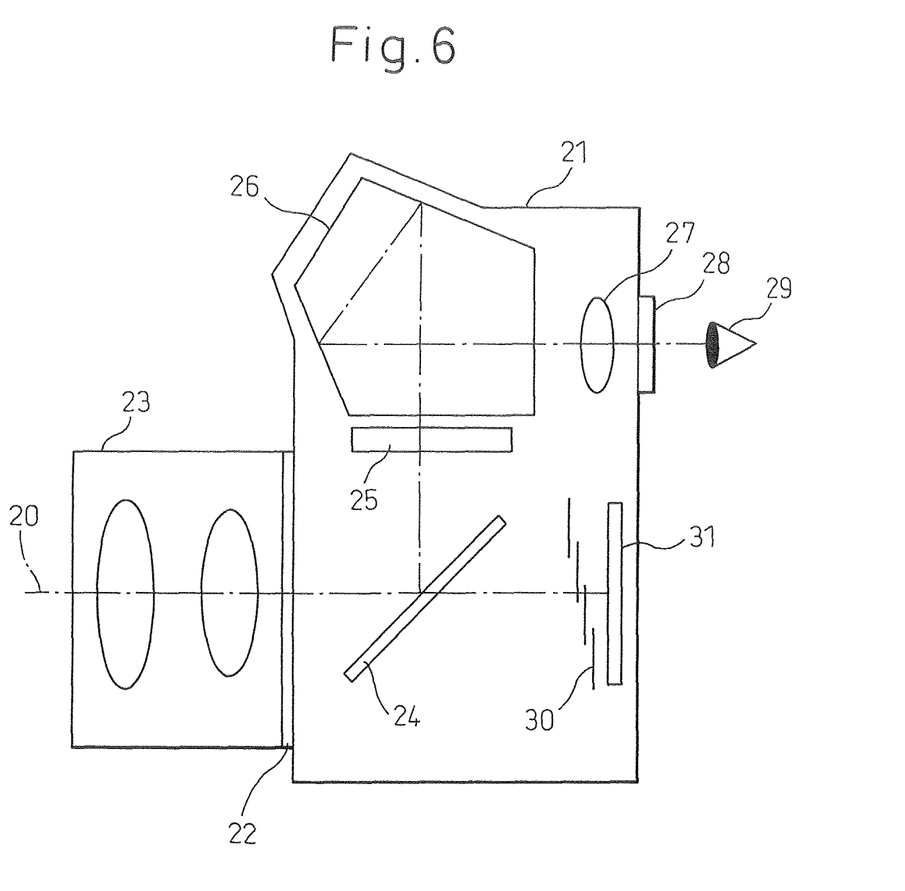
FIG. 6 is a cross-sectional view of a camera according to the present invention.

Next, an embodiment will be described in which the display panel of the present invention is adapted for use in a typical single-lens reflex camera. FIG. 6 shows a cross section of the camera. A picture-taking lens 23 is mounted to a camera body 21 by means of a lens attachment mount 22. Light 20 that is taken in through the picture-taking lens 23 is reflected by a half mirror 24 inside the camera body 21, and enters a pentaprism 26 by passing through the display panel 25. The light 20 is reflected by the pentaprism 26, and reaches an eye of an observer 29 by passing through an eyepiece 27 and a viewfinder 28. On the other hand, the light transmitted through the half mirror 24 is focused through a shutter 30 onto an imaging device 31 for recording of the image.

According to the above configuration, since the display panel of the present invention is mounted inside the camera body 21, various marks, symbols, etc. to be displayed for camera operation can be displayed using the display panel 25 having a plurality of segment electrodes and can be viewed by the observer through the viewfinder 28 in a superimposed fashion on the image to be photographed. Any one of the display panels according to the first to third embodiments of the invention may be used as the display panel here. According to the camera of the present invention, since the backup electrode is disposed so as to accommodate the gap between the segment electrode and the background electrode and the gap between adjacent segment electrodes in the display panel 25 mounted inside the camera body 21, the gap between the segment electrode and the background electrode or between the adjacent segment electrodes can be made not easily visible, while allowing the gap to be formed wide enough. In this way, the gap between the segments or between the segment and the background electrode can be made not easily visible even when the display on the display panel 25 is magnified for viewing through the eyepiece 27 of the camera.

While the above has been described an example in which the display panel of the present invention is adapted for use in a single-lens reflex camera, the invention is not limited to the above example, but can be applied not only to single-lens reflex cameras but also to video cameras or the like.

Figure 7:
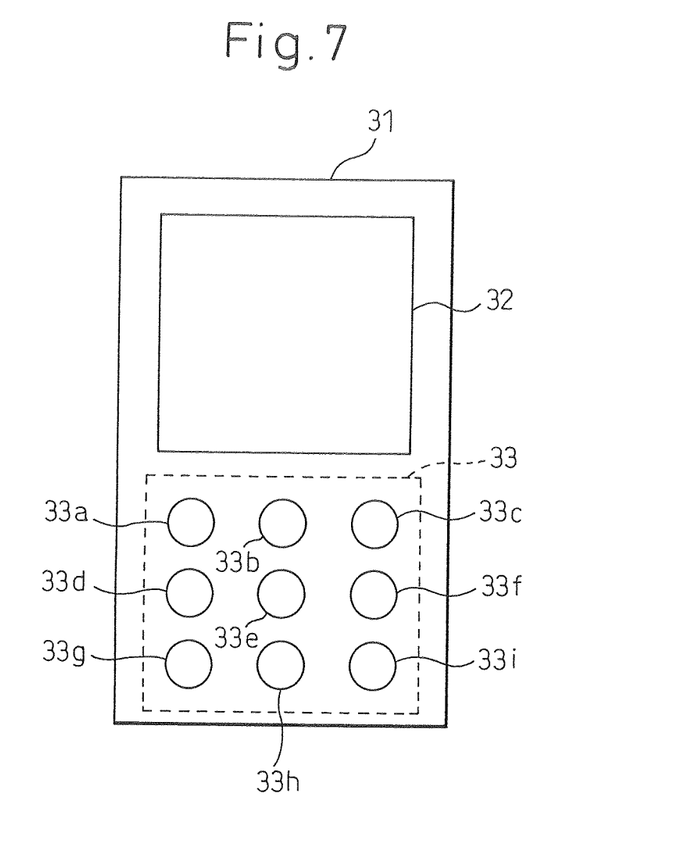
FIG. 7 is a plan view of a portable terminal in which the display panel of the present invention is used in a programmable keyboard.

Next, an example will be described in which the display panel of the present invention is adapted for use in a programmable keyboard of a portable terminal. FIG. 7 shows a diagram schematically illustrating the portable terminal 31. The portable terminal 31 has a display section 32 and a keyboard 33 on its operating side. The keyboard 33 has a plurality of keys 33a, 33b, ..., 33i. Each key includes a display panel which is designed to be able to display a plurality of characters so that a single key can function as a plurality of keys. In the programmable keyboard, the plurality of characters assigned to each particular key are not arranged side by side, but only the character to be entered can be selectively displayed on the key.

Figure 8:
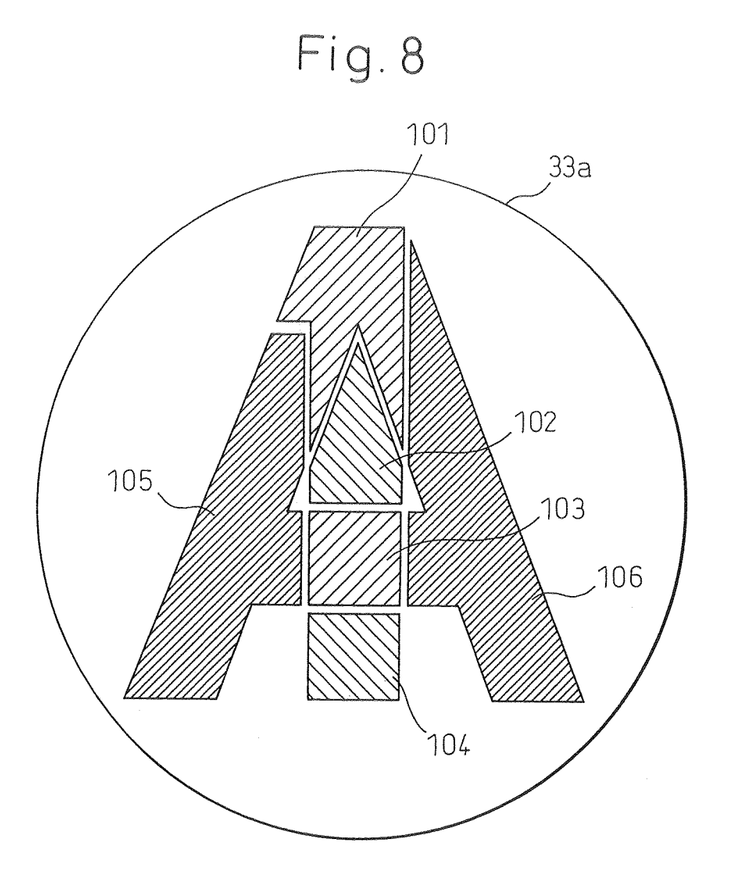
FIG. 8 is a plan view showing an arrangement of segments on one particular key on a prior art programmable keyboard.
Figure 9A:
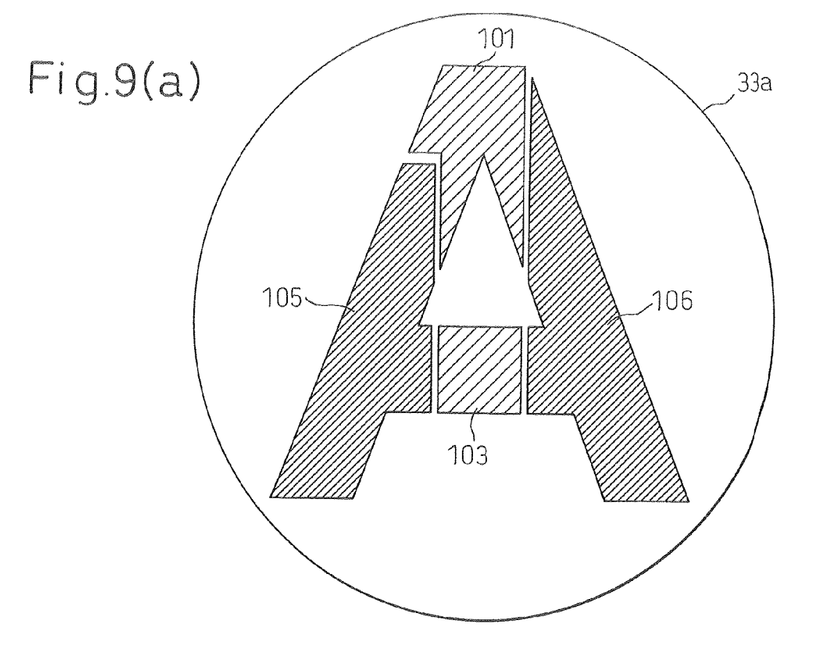
Figure 9B:
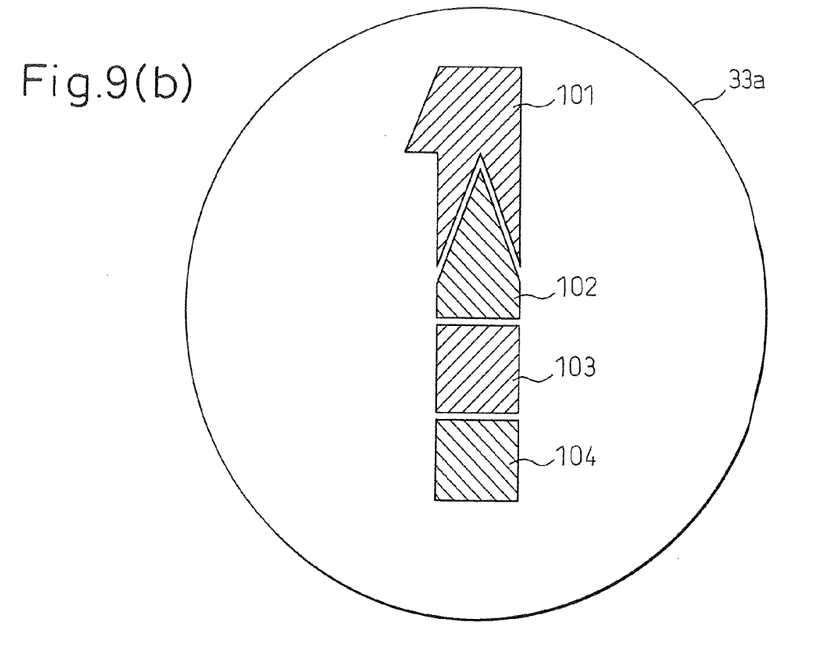

A specific configuration of such a key that forms part of the programmable keyboard will be described with reference to FIG. 8. The following description deals with the case in which two characters "A" and "1" are selectively displayed, for example, on one particular key 33a on the keyboard 33 of the portable terminal of FIG. 7. FIG. 8 shows an example in which a prior art display panel having six segments 101 to 106 is incorporated in the key 33a. The character "A" or "1" can be displayed by selectively displaying the segments 101 to 106. More specifically, when displaying the character "A", the display is produced by driving the liquid crystal by applying voltage to the segments 101, 103, 105, and 106, as shown in FIG. 9(a). On the other hand, when displaying the character "1", the display is produced by driving the liquid crystal by applying voltage to the segments 101 to 104, as shown in FIG. 9(b). Such display switching can be accomplished, for example, by switching the keyboard input mode to the alphabetic input mode or to the numeric input mode.

When using the display panel to display a key designation on the programmable keyboard, since one character is formed using a plurality of separated segments, it is preferable to minimize the spacing between adjacent segments from the standpoint of enhancing the appearance of the character. However, as the spacing between adjacent segments is reduced, the risk of shorts between the transparent electrodes forming the segments increases due to such factors as variations in patterning. Conversely, if the segment spacing is increased, there can occur the problem that the plurality of separated segments may lose their unified appearance, degrading the appearance of the displayed character.

Figure 10:
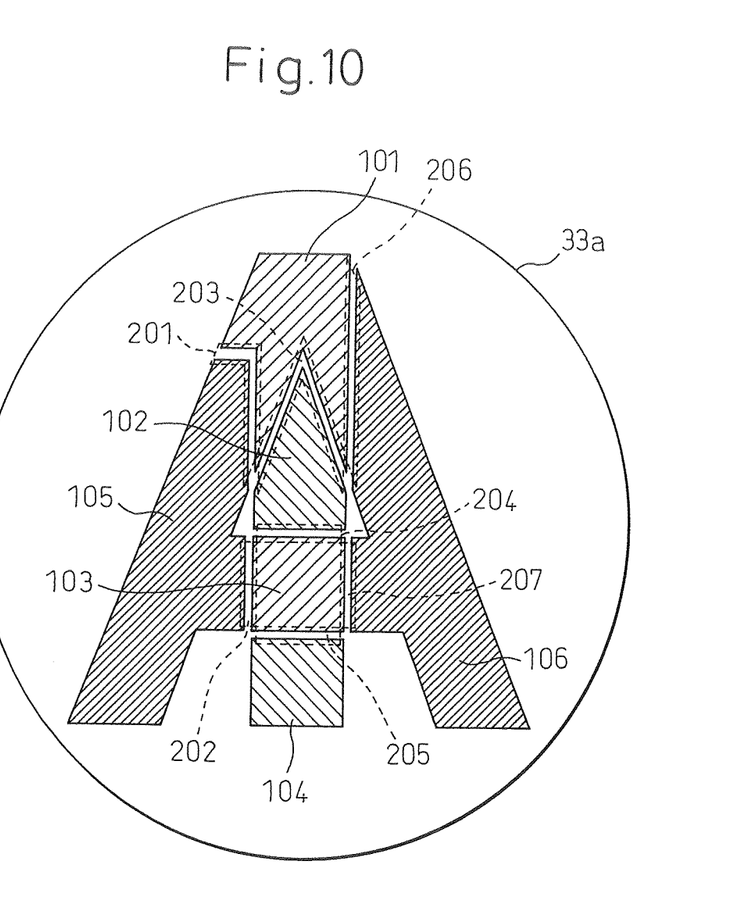
FIG. 10 is a plan view showing an arrangement of segments on one particular key on the programmable keyboard in which the display panel of the present invention is used.
Figure 11A:
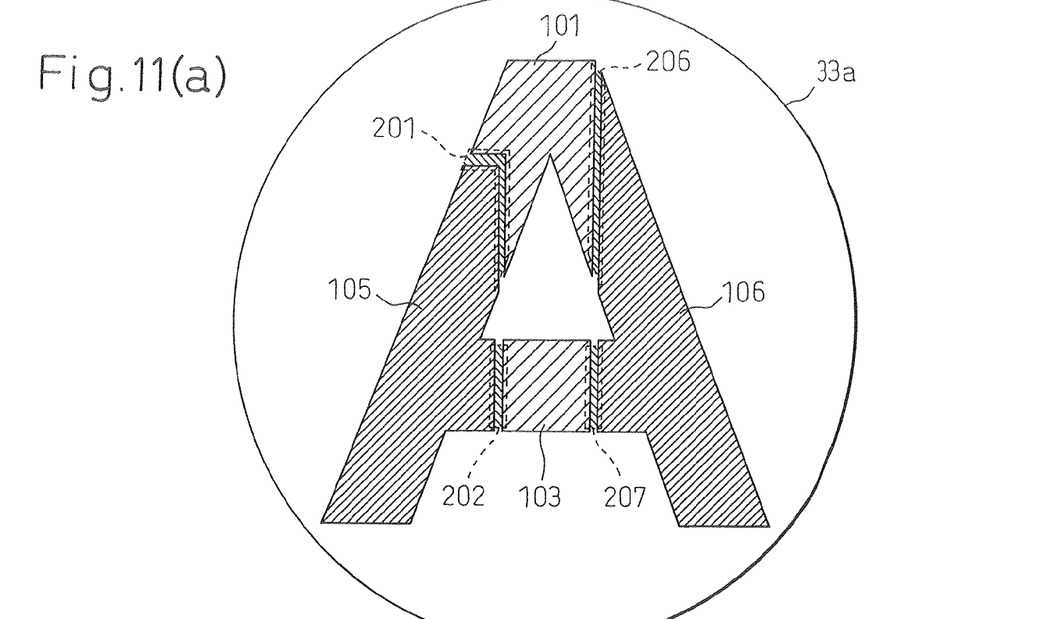

This problem can be alleviated by applying the display panel of the present invention for each key of the programmable keyboard. An example in which the display panel of the present invention is adapted for use in the programmable keyboard will be described with reference to drawings. FIG. 10 shows a display panel layout in which the segments are arranged so that the characters "A" and "1" can be displayed on one particular key 33a in a manner similar to that shown in FIG. 8. The layout of the segments 101 to 106 is the same as that shown in FIG. 8, but the difference is that, in the present invention, backup electrodes 201 to 207 are provided in a layer located below the gaps between respective pairs of adjacent segments and are covered by an insulating film. The positional relationship of the backup electrodes 201 to 207 relative to the segment electrodes 101 to 106 is the same as that shown in the first to third embodiments. For example, when displaying the character "A", the liquid crystal is driven by applying voltage not only to the segments 101, 103, 105, and 106 but also to the backup electrodes 201, 202, 206, and 207, as shown in FIG. 11(a). By arranging the backup electrodes between the respective pairs of adjacent segments in this way, it is possible to drive the liquid crystal lying between the respective segments, and even if the segment spacing is enlarged, the gap can be made not easily visible when displaying a character.

Figure 11B:
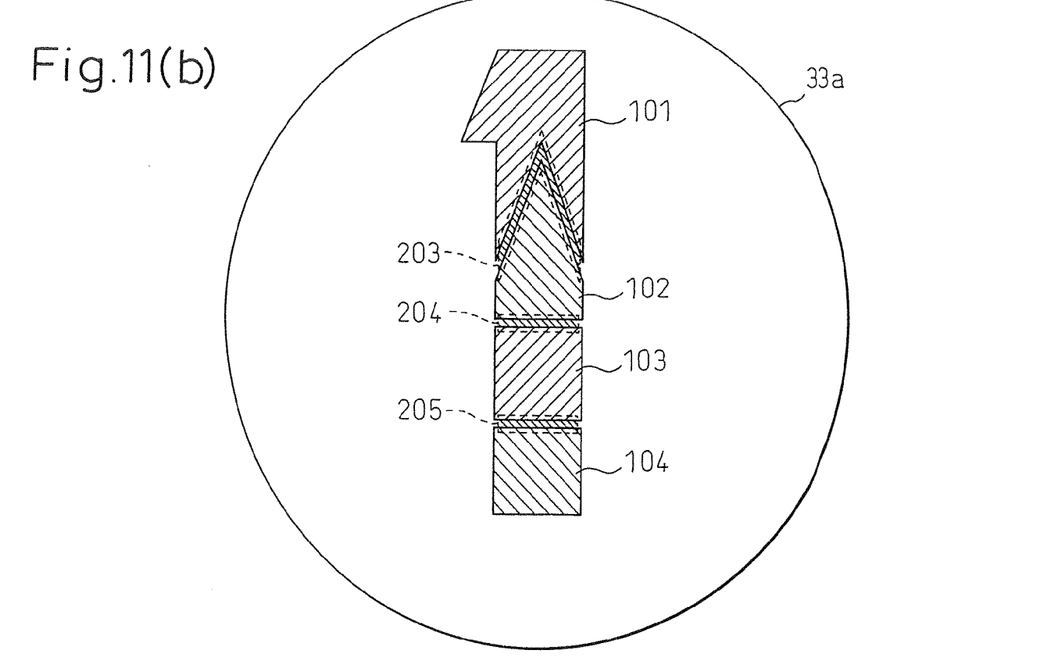

Similarly, when displaying the character "1", the liquid crystal is driven by applying voltage not only to the segments 101 to 104 but also to the backup electrodes 203 to 205, as shown in FIG. 11(b); in this way, even if the segment spacing is enlarged, the gap can be made not easily visible when displaying a character.

The above description has dealt with an example in which the character "A" or "1" is displayed, but if no voltage is applied to the segment electrodes, neither "A" nor "1" will be displayed.

Further, various combinations other than the combination of "A" and "1" are also possible.

While the above has described an example in which the display panel of the present invention is applied to a camera or a programmable keyboard, it will be appreciated that the display panel of the present invention is not limited in its application to such particular examples. For example, the display panel of the present invention can also be used in various other displays such as those in remote controllers of household electric appliances, mobile telephones, music players, watches, eyeglass mounted displays, etc.

What is claimed is:

1. A camera comprising:
a half mirror for reflecting a portion of an image;
a viewfinder for viewing said image;
a display panel provided between said half mirror and said viewfinder,
said display panel comprising
a first substrate having a first electrode and a second electrode formed on one and the same side thereof;
a second substrate disposed opposite said first substrate;
a gap formed between said first electrode and said second electrode;
a backup electrode formed only below said gap and in the vicinity thereof on said first substrate so as to extend along said gap in an overlapping fashion; and
a wiring electrode electrically connected to said first or second electrode,
wherein said wiring electrode and said backup electrode are formed in the same plane by depositing ITO on said first substrate, so that said backup electrode and said first or second electrode connected to said wiring electrode are at a same potential, and said wiring electrode and said backup electrode are formed on a same horizontal face of said first substrate when said wiring electrode and said backup electrode are formed in an integrated fashion.

2. The display panel as claimed in claim 1, wherein a portion of said backup electrode overlaps a portion of at least one of said first and second electrodes.

3. A camera comprising:
a picture-taking lens for focusing an image of a subject;
a half mirror for reflecting a portion of said image;
a viewfinder for viewing said image; and
a display panel provided between said half mirror and said viewfinder,
wherein said display panel includes
a first substrate having a first electrode and a second electrode formed on one and the same side thereof,
a second substrate disposed opposite said first substrate,
a gap formed between said first electrode and said second electrode,
a backup electrode formed only below said gap and in the vicinity thereof on said first substrate so as to extend along said gap in an overlapping fashion, and
a wiring electrode electrically connected to said first or second electrode,
wherein said wiring electrode and said backup electrode are formed in the same plane by depositing ITO on said first substrate, so that said backup electrode and said first or second electrode connected to said wiring electrode are at a same potential, and said wiring electrode and said backup electrode are formed on a same horizontal face of said first substrate when said wiring electrode and said backup electrode are formed in an integrated fashion.

4. A camera comprising:
a half mirror for reflecting a portion of an image;
a viewfinder for viewing said image;
a display panel provided between said half mirror and said viewfinder,
said display panel comprising
a first substrate having a first electrode and a second electrode formed on one and the same side thereof;
a second substrate disposed opposite said first substrate;
a gap formed between said first electrode and said second electrode;
a backup electrode formed only below said gap and in the vicinity thereof on said first substrate so as to extend along said gap in an overlapping fashion; and
a wiring electrode electrically connected to said first or second electrode, and said backup electrode,
wherein said wiring electrode and said backup electrode are formed in the same plane by depositing ITO on said first substrate, so that said backup electrode and said first or second electrode connected to said wiring electrode are at a same potential, and said wiring electrode and said backup electrode are formed on a same horizontal face of said first substrate when said wiring electrode and said backup electrode are formed in an integrated fashion.

* * * * *